United States Patent
Faust

[15] 3,651,374
[45] Mar. 21, 1972

[54] SWITCHING ARRANGEMENT FOR DISCONNECTING HIGH-VOLTAGE DIRECT-CURRENT LINES

[72] Inventor: Werner Faust, Wettingen, Switzerland
[73] Assignee: Aktiengesellschaft Brown, Boveri & Cie, Baden, Switzerland
[22] Filed: Feb. 17, 1971
[21] Appl. No.: 116,177

[30] Foreign Application Priority Data

Feb. 20, 1970 Switzerland ........................2422/70

[52] U.S. Cl..................317/11 A, 200/144 AP, 307/136, 307/252 L, 307/252 M, 317/11 E
[51] Int. Cl.....................H02h 7/22, H03k 17/72
[58] Field of Search...........200/144 AP; 307/136, 252 L, 307/252 M, 252 W; 315/240; 317/11 A, 11 B, 11 E; 328/78

[56] References Cited

UNITED STATES PATENTS

| | | | |
|---|---|---|---|
| 2,619,524 | 11/1952 | Dorsten | 317/11 B |
| 3,249,810 | 5/1966 | Strom et al. | 317/11 A |
| 3,287,576 | 11/1966 | Motto, Jr. | 307/252 L |
| 3,309,570 | 3/1967 | Goldberg | 317/11 A |
| 3,430,062 | 2/1969 | Roth | 317/11 E X |
| 3,461,319 | 8/1969 | Motto, Jr. et al. | 307/252 L |
| 3,534,226 | 10/1970 | Lian | 317/11 E |

Primary Examiner—Donald D. Forrer
Assistant Examiner—L. N. Anagnos
Attorney—Pierce, Scheffler & Parker

[57] ABSTRACT

A switching arrangement for disconnecting a high-voltage direct-current line includes a commutation device constituted by even number of main electric valves of the controllable semiconductor type each of which except the last as seen from the positive terminal of the line is paralleled by an ohmic resistance, an auxiliary valve correlated to each of the main valves and which are also connected in series, and commutation condensers between the cathode sides of the main and auxiliary valves. A first circuit breaker arranged in series with the commutation device serves to connect the device to the line and a second circuit breaker is connected in parallel with the commutation device.

Transmission of a disconnecting command to the circuit breaker paralleling the electric valves also serves to render the main valves conductive thus commutating the load current so that the circuit breaker opens in an arc-free manner. The load current commutated to the string of main valves is then progressively reduced through the resistances by sequential ignition of the auxiliary valves which produces a sequential extinction of the main valves. The series connected circuit breaker then opens isolating the load circuit from the high-voltage line.

6 Claims, 4 Drawing Figures

SWITCHING ARRANGEMENT FOR DISCONNECTING HIGH-VOLTAGE DIRECT-CURRENT LINES

The present invention relates to a switching arrangement for disconnecting high-voltage direct-current lines by means of a commutation device which includes a series-connection of controllable electric valves that are poled in the forward direction, an ohmic resistance being connected in parallel to each controllable valve, with the exception of the last valve in the series connection, seen from the positive high-voltage terminal. Such an arrangement is known, for example, from Swiss Pat. No. 231,972.

If the valves are quenched in steps, in the known arrangement, the connected parallel resistances become operative and function to reduce the current. The object of such an arrangement is to transform the magnetic energy contained in the circuit at the start of the disconnection into thermal energy, and to carry it off.

In the known arrangements, the valves are quenched by connecting commutation condensers by means of additional controlled valves or switches parallel to the valves. The commutation condensers must be so charged by a separate charging device that the discharge current flowing over the valve to be quenched is oppositely directed to the forward current of this valve and exceeds it at least temporarily. However, this requires large, high-voltage resistant and therefore expensive condensers. Accordingly, the respective charging device must also be expensive. Furthermore, at least one of the controllable electric valves in the known arrangements is traversed by the entire load current in the connected state of the arrangement.

The primary object of the present invention is to provide an improved arrangement which permits one to use a smaller number of commutation condensers and to eliminate a charging device, and where furthermore, the controllable valves of the commutating means are only traversed by current during the disconnection.

The problem is solved according to the invention in that the commutation device is connected in series with a circuit breaker, that an additional circuit breaker is connected in parallel, that the commutation device includes an even number of controllable electric valves, that an auxiliary controllable electric valve is assigned to each controllable electric valve in such a manner that the auxiliary electric valves are connected in series with each other, the anode of the first controllable electric valve and the anode of the first auxiliary controllable electric valve being interconnected, and the cathodes of the above-mentioned valves being connected over a commutation condenser, that furthermore the cathode of the last controllable electric valve and the cathode of the last auxiliary controllable electric valve are interconnected by way of an ohmic resistance, and the anodes of the last valves over a commutation condenser.

The advantages of the invention consist, in particular, in that only half as many commutation condensers are required as compared with operatively equivalent known arrangements, and that in addition, an expensive charging device is not necessary.

Since the valves of the commutation device carry current only during the disconnection, i.e., only for a few milliseconds, elimination of heat from the parts is not of any consequence and hence the parts can be made relatively small, which is another advantage.

It is also advisable to arrange inductances in series with the commutation condensers in order to limit the current in the valves during connection.

If the requirements are particularly high, it is advisable to arrange commutation inductances in series with each auxiliary valve and in series with the last valve of the series-connection.

It is of particular advantage to couple the commutation device over a diode bridge with the high-voltage direct-current line and with the circuit breakers. The switching arrangement is thus suitable for disconnecting high-voltage lines of any polarity. It was also found expedient to design the control for the auxiliary valves as a followup type of control.

The foregoing objects and advantages inherent in the improved switching arrangement for disconnecting high-voltage direct-current lines will become more apparent from the following detailed description of several suitable embodiments thereof and the accompanying drawings wherein.

With respect to the different views in the drawings, identical components in the circuits have been provided with the same reference characters which have the following significance.

$L_0$ — line inductance; $R_0$ — ohmic resistance of line; $S_1$ and $S_2$ — circuit breakers; E — direct voltage; $R_1$ to $R_{n-1}$ — ohmic resistances; $T_1$ to $T_n$ — controllable electric valves; $H_1$ to $H_n$ — auxiliary controllable electric valves; $C_1$ to $C_n$ — commutation condensers; $R_K$ — ohmic resistance; $L_1$ and $L_2$ — inductances; $L_K$ and $L_{K1}$ to $L_{K4}$ — commutation inductances; $D_1$ to $D_4$ — diodes.

Figure 1:
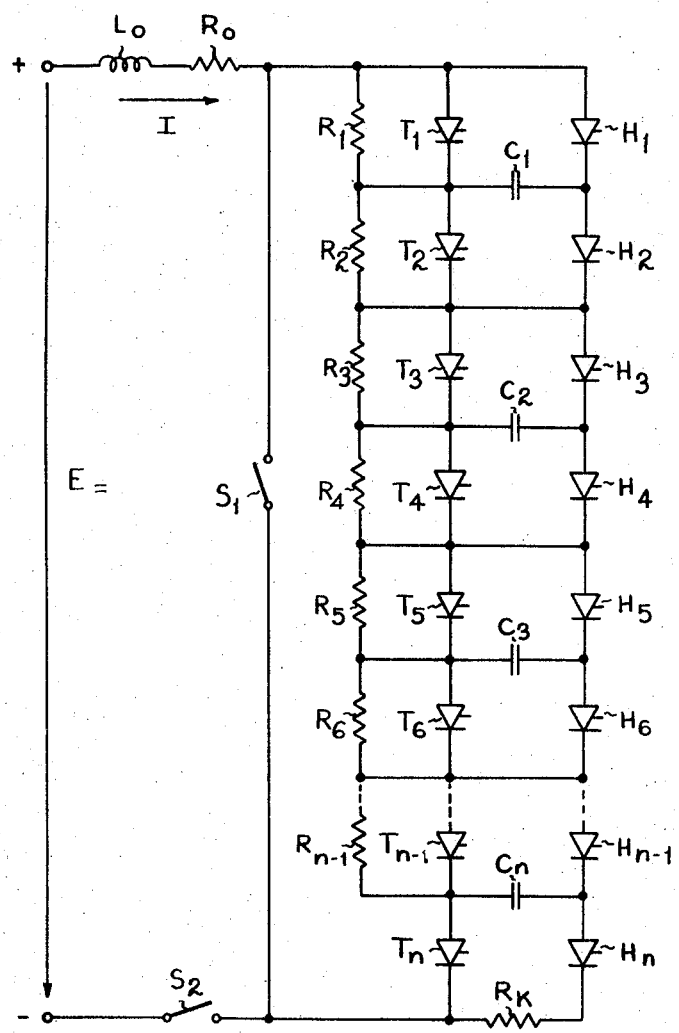
FIG. 1 is a circuit diagram illustrating one suitable embodiment.

In the circuit depicted in FIG. 1, the positive and negative sides of the high voltage line are connected by a circuit breaker $S_1$ and a second circuit breaker $S_2$ is connected in the negative side of the line. Connected in parallel with the circuit breaker $S_1$ is a string of series connected controllable electric valves $T_1$ to $T_n$ and connected in parallel with the string of valves $T_1$ to $T_n$ is a string of auxiliary controllable electric valves $H_1$ to $H_n$. A resistance $R_K$ is connected between the cathodes of the last valves $T_n$ and $H_n$ and resistances $R_1$ to $R_{n-1}$ are connected in parallel respectively with valves $T_1$ to $T_{n-1}$. A commutation condenser $C_1$ is connected between the cathodes of valves $T_1$ and $H_1$, another such condenser $C_2$ is connected between the cathodes of valves $T_3$ and $H_3$, another condenser $C_3$ between the cathodes of valves $T_5$ and $H_5$ and a last such condenser $C_n$ between the cathodes of valves $T_{n-1}$ and $H_{n-1}$.

The method of operation of the arrangement according to FIG. 1 is as follows:

The condensers $C_1$ to $C_n$ must be so charged when the arrangement is first started, preferably by hand, that the condenser plate connected to the connection between the cathodes and anodes of the controllable valves $T_1$ to $T_n$ is charged positive.

In the connected state, the circuit breakers $S_1$ and $S_2$ are closed. When circuit breaker $S_1$ starts to open, the valves $T_1$ to $T_n$ are ignited by means of a conventional control which applies ignition pulses to the control electrodes thereof, and the load current I is commutated, because of the decreasing contact pressure and the rising voltage drop on circuit breaker $S_1$ from the latter to the series-connection of valves $T_1$ to $T_n$. Circuit breaker $S_1$ can then be opened in an arc-free manner. Auxiliary valve $H_1$ is then ignited. Commutation condenser $C_1$ can thus be discharged over the opened auxiliary valve $H_1$ and the conductive valve $T_1$ and thus quench valve $T_1$.

The load current I flows then briefly over the auxiliary valve $H_1$, commutation condenser $C_1$ and the series-connection of the valves $T_2$ to $T_n$. When commutation condenser $C_1$ is charged, this circuit is thus blocked and auxiliary valve $H_1$ is quenched. The load current I must now flow over ohmic resistance $R_1$ and the series-connection of the valves $T_2$ to $T_n$, so that a part of the energy to be eliminated is already transformed into heat.

The load current I drops with the time constant $L_0 : (R_0 + R_1)$ of the circuit to a new value. Shortly before it attains this value, auxiliary valve $H_2$ is ignited.

The commutation condenser $C_1$ which is now charged to a reverse polarity, is discharged over auxiliary valve $H_2$ and the opened valve $T_2$ so that the latter is quenched. Then the already reduced load current I flows over ohmic resistance $R_1$, commutation condenser $C_1$, which is thus charged again to its initial polarity, auxiliary valve $H_2$, and the series-connection of the valves $T_3$ to $T_n$.

When commutation condenser $C_1$ is charged, the remaining load current I flows over resistances $R_1$ and $R_2$. The commutation in the following stages (any even number) is effected in the same manner.

Due to the ignition of the last auxiliary valve $H_n$, the commutation condenser $C_n$ is discharged over ohmic resistance $R_K$ which serves as a damping member for the discharge, and valve $T_n$ is quenched by the latter.

Corresponding to the number of resistances $R_1$ to $R_{n-1}$ which are now in the load circuit, the load current has now dropped so far that commutation condenser $C_n$ suffices to absorb the low remaining energy and to interrupt the current. Circuit breaker $S_2$ can then be opened in an arc-free manner, and the high-voltage line is thus also galvanically disconnected.

The commutation device is again in the starting position or state, i.e., all of the main and auxiliary valves are quenched and all commutation condensers are charged with the above-indicated polarity.

Figure 2:
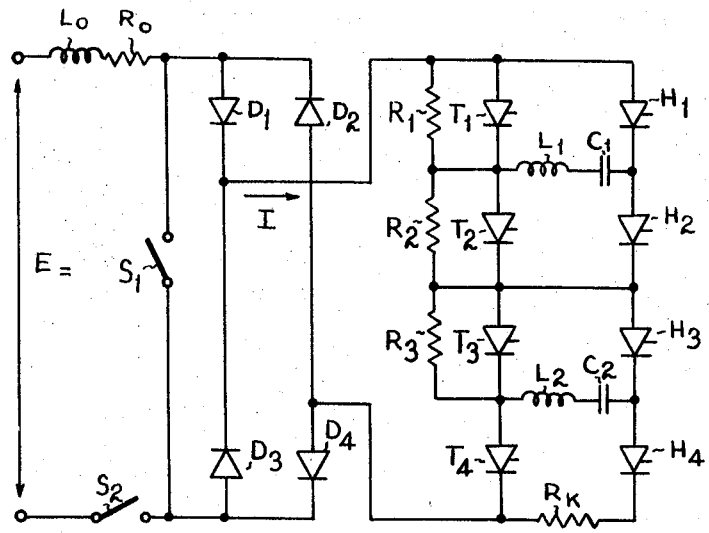
FIG. 2 is also a circuit diagram illustrating a modification of the arrangement of FIG. 1 wherein inductances are connected in series with the commutating condensers.

If inductances, in the illustrated example $L_1$, $L_2$, are arranged in series with the commutation condensers, $C_1$, $C_2$ as shown in the modified embodiment of FIG. 2, the rising rate of the current $di/dt$ is limited during the condenser discharge so that the valves cannot be overstressed. This is of particular advantage when valves of the semiconductor type, as illustrated, are utilized.

Figure 3:
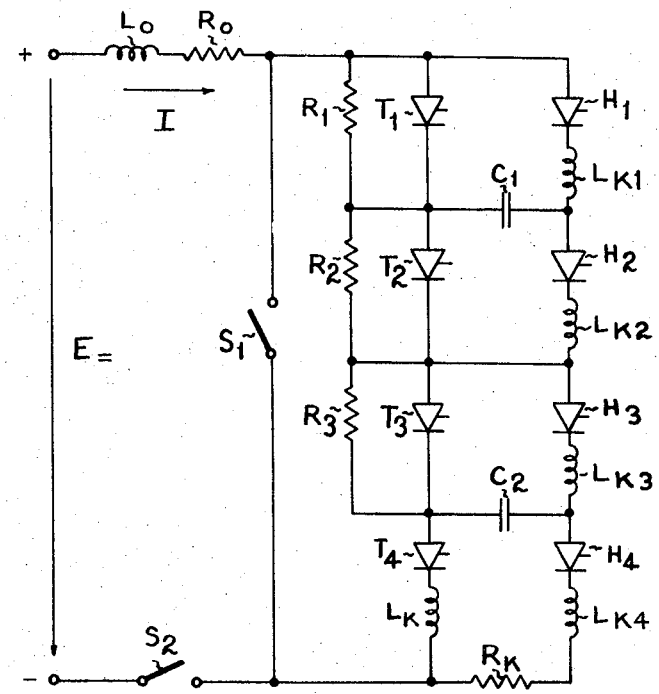
FIG. 3 is likewise a circuit diagram illustrating a further modification of the FIG. 1 circuit wherein commutating inductances are connected in series with the auxiliary valves.

Optimum protection for the valves is ensured when commutation inductances $L_K$, $L_{K1}$ to $L_{K4}$ are arranged in series with each auxiliary valve and in series with the last valve $T_4$ of the series connection, as illustrated in the modified circuit arrangement of FIG. 3.

If a part of a meshed direct current supply grid drops out, for example, by line breakage this can have the result that the current direction in the high-voltage line will be reversed in another grid section. It is therefore of particular advantage to connect the commutation device over a diode bridge $D_1$ to $D_4$ to the high-voltage direct-current line and the circuit breakers $S_1$ and $S_2$, also as illustrated in FIG. 2. The disconnecting device can then be operated independently of the respective current direction. Damage to the valves in the event of a failure of the meshed DC grid is thus positively prevented.

According to a preferred embodiment, control of the auxiliary valves is so effected that only the first part of the series connection is ignited by an ignition device. Since this auxiliary valve becomes conductive, an ignition pulse for the second auxiliary valve can be conducted over suitable known coupling elements such as a resistance-condenser-combination. The second valve, in turn, supplies ignition pulse for the next valve, etc. Such a followup control is described, for example, in U.S. Pat. No. 3,287,576.

In the drawing, the circuit breakers are illustrated as being of the mechanical type. However, these breakers $S_1$ and $S_2$ can take the form of gas discharge valves or controllable semiconductor valves. The circuit breaker $S_2$ is connected in series with the overall commutating device comprising the main and auxiliary condensers, ohmic resistances, commutating condensers and inductances, and circuit breaker $S_1$ is connected in parallel with the overall commutating device.

Figure 4:
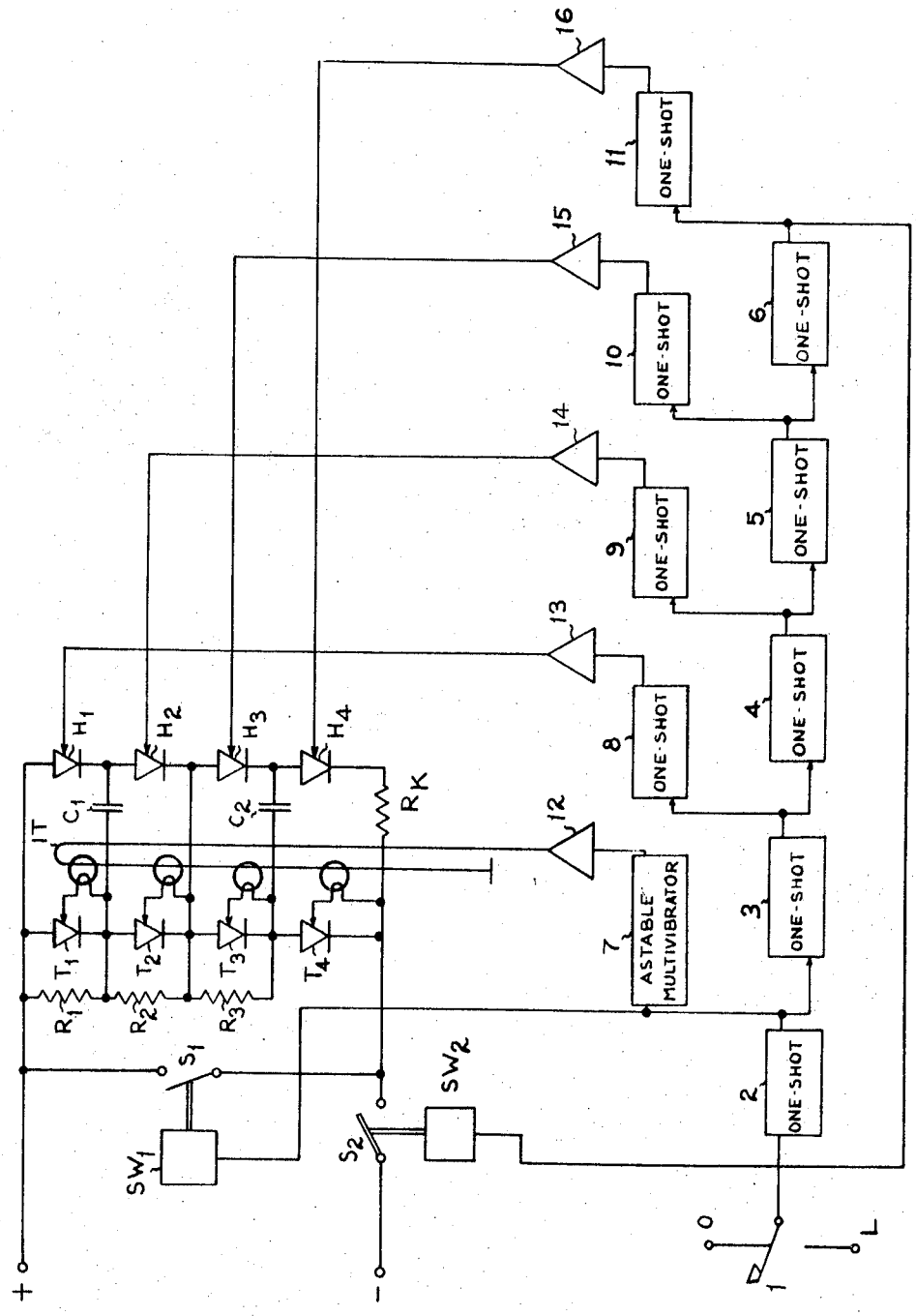
FIG. 4 is a schematic circuit diagram of one suitable electronic control arrangement for effecting ignition of the main controllable valves, the auxiliary controllable valves and the two circuit breakers.

One suitable circuit arrangement for controlling the ignition of main and auxiliary electric valves T and H and actuation of the two circuit breakers $S_1$ and $S_2$ in their required sequence is illustrated in FIG. 4. This circuit is seen to include an actuating device $SW_1$ for the circuit breaker $S_1$ depicted in FIGS. 1 to 3, a similar actuating device $SW_2$ for circuit breaker $S_2$, and a pulse transformer IT which is described in further detail in U.S. Pat. No. 3,524,126. Further included are a switch 1 actuatable between two terminals to provide either an O-signal or an L-signal as a static input for a "flip-flop" 2, also known as a "one-shot," an arrangement of other one-shots 3, 4, 5 and 6 with dynamic inputs cascaded to the output from one-shot 2, an astable multivibrator 7 having an input connected intermediate the output from 2 and the input to 3, other one-shots 8, 9 and 10 with dynamic inputs connected respectively between 3 and 4, and 4 and 5, and 5 and 6, and still another one-shot 11 with dynamic input connected to the output of one-shot 6. An amplifier 12 has its input connected to the output from multivibrator 7 and its output connected to the primary winding of transformer IT. A plurality of secondary windings on this transformer are connected respectively to the ignition electrode terminals of the main valves $T_1$ to $T_4$. Other pulse amplifiers 13 to 16 have their inputs connected respectively to the outputs from one-shots 8 to 11 and their outputs connected respectively to the ignition electrode terminals of the auxiliary valves $H_1$ to $H_4$. The output from one-shot 2 is connected to and provides a triggering pulse for the actuating mechanism $SW_1$ of circuit breaker $S_1$ and the output from one-shot 6 is connected to and provides a triggering pulse for the actuating mechanism $SW_2$ of circuit breaker $S_2$.

In order to initiate a switching-out procedure the switch 1 is actuated briefly from the position shown in FIG. 4 from the "0" terminal position to the "L" terminal position. This serves to apply an L-signal to the input of one-shot 2 which produces an output therefrom. The L-signal output from 2 sets into operation, on the one hand, the drive $SW_1$ for circuit breaker $S_1$ and which commences to open; on the other hand, applies an input to the astable multivibrator 7 which then starts to run and produce an output consisting of a series of short pulses which are amplified in amplifier unit 12 and applied to the primary winding of pulse transformer IT.

When circuit breaker $S_1$ begins to open, the voltage rises across the series circuit arrangement of the main valves $T_1$ to $T_4$ and these will then be rendered conductive by the ignition pulses applied simultaneously to the control electrodes of these valves by the voltage pulses induced in the secondary windings of pulse transformer IT. Commutation of the load current to the then conducting main valves $T_1$ to $T_4$ thus permits circuit breaker $S_1$ to open in an arc-free manner.

After the one-shot 2 trips back to its rest position, the astable multivibrator 7 is cut off. Therefore the time characteristic of the one-shot 2 must be a little greater than the time span which is required for a complete opening of circuit breaker $S_1$.

As soon as one-shot 2 trips back to its rest position, one-shot 3 is set by means of the flank of the LO-transition. That is, its output goes from O to L. The output from 3 is applied to one-shots 4 and 8, the one-shot 3 trips back to its rest position, and the change in the output on 8 from O to L causes an amplified pulse to be transmitted via amplifier 13 to the ignition electrode of auxiliary valve $H_1$ causing the latter to conduct. Similarly the sequentially produced outputs from one-shots 4, 5 and 6 serve to produce sequential pulses from one-shots 9, 10 and 11 which are amplified respectively in amplifiers 14, 15 and 16 and applied in succession to the control electrodes of auxiliary valves $H_2$, $H_3$ and $H_4$. As these valves $H_1$ to $H_4$ are rendered conductive in sequence, they function to extinguish the main valves $T_1$ to $T_4$ also in sequence, with the result that the load current is progressively reduced in the resistances $R_1$ to $R_3$. The time characteristics of the one-shots are different and are of course so selected so as to obtain the optimum lowering of the load current so that after ignition of the last auxiliary valves in the series, e.g., valve $H_4$, the circuit breaker $S_2$ can then be opened without arcing thus to galvanically isolate the load circuit from the line.

This completes one cycle of the disconnecting process and the one-shots will now have all been reset to their rest position, ready for initiation of another disconnecting procedure.

I claim:

1. A switching arrangement for disconnecting a high voltage direct-current line by means of a commutation device which includes a series connection of an even number of main electric valves of the controllable type poled in the forward direction, ohmic resistances connected respectively in parallel with each of said main valves excepting the last in the series as seen from the positive terminal of the line, an auxiliary electric valve of the controllable type correlated to each of said main valves and which are also connected in series, the anodes of said first main and auxiliary valves being interconnected and the cathodes of said first main and auxiliary valves being interconnected by circuit means including a commutation condenser, the cathodes of said last main and auxiliary valves being interconnected through an ohmic resistance and the anodes of said last main and auxiliary valves being interconnected by circuit means including a commutation condenser, a first circuit breaker arranged in series with said commutating device and serving to connect said device to said line, and a second circuit breaker connected in parallel with said commutation device.

2. A switching arrangement as defined in claim 1 for disconnecting a high-voltage direct-current line in which more than two main electric valves are connected in series and the electrodes of the other correlated main and auxiliary valves are connected with each other alternately over a commutation condenser, or directly.

3. A switching arrangement as defined in claim 1 for disconnecting a high-voltage direct-current line and which further includes an inductance connected in series with each of said commutation condensers.

4. A switching arrangement as defined in claim 1 for disconnecting a high-voltage direct current-line and which further includes an inductance connected in series with said last main valve and further inductances connected respectively in series with each of said auxiliary valves.

5. A switching arrangement as defined in claim 1 for disconnecting a high-voltage direct-current line and which further includes a diode bridge in the circuit connections between said commutating device and said circuit breakers and said line.

6. A switching arrangement as defined in claim 1 wherein a control of the follow-up type is utilized to control said auxiliary valves.

* * * * *